(12) United States Patent
Saeger

(10) Patent No.: US 6,634,435 B2
(45) Date of Patent: Oct. 21, 2003

(54) WATER JET WEEDER, CULTIVATOR, ROOT WATERER, AND AERATOR

(76) Inventor: David C. Saeger, 487 Pine Ave., Wisconsin Rapids, WI (US) 54494

( * ) Notice: Subject to any disclaimer, the term of this patent is extended or adjusted under 35 U.S.C. 154(b) by 0 days.

(21) Appl. No.: 10/338,056

(22) Filed: Jan. 8, 2003

(65) Prior Publication Data

US 2003/0136566 A1 Jul. 24, 2003

Related U.S. Application Data

(60) Provisional application No. 60/350,612, filed on Jan. 22, 2002.

(51) Int. Cl.[7] .............................................. A01B 45/00
(52) U.S. Cl. ......................... 172/21; 111/7.2; 239/271; 239/289
(58) Field of Search ....................... 172/21, 22; 111/7.1, 111/7.2, 7.3; 239/271, 272, 289, 532, 525, 592, 597, 599

(56) References Cited

U.S. PATENT DOCUMENTS

| 708,126 A | 9/1902 | Chase |
| 1,408,584 A | 3/1922 | Glasgow |
| 3,143,984 A | 8/1964 | Morasch |
| 3,326,306 A | 6/1967 | Weir |
| 4,466,490 A | 8/1984 | Eckels ......................... 171/50 |
| 4,606,089 A | 8/1986 | King ...................... 172/375 X |
| 5,056,440 A | 10/1991 | Eissens ........................ 111/7.1 |
| 5,257,666 A | 11/1993 | Townsend, Jr. ............. 172/378 |
| 5,709,273 A | 1/1998 | Roth ........................... 172/22 |
| 5,787,990 A | 8/1998 | Miller ......................... 172/21 |
| 5,822,968 A | 10/1998 | Savala ..................... 56/400.04 |
| 6,109,013 A | 8/2000 | Scott ....................... 56/400.05 |
| 6,289,828 B1 | 9/2001 | Wittenberg ................. 111/106 |

FOREIGN PATENT DOCUMENTS

| DE | 39 19 375 A1 | 12/1990 |
| GB | 2 212 373 A | 7/1989 |
| GB | 2 233 537 A | 1/1991 |
| GB | 2 240 247 A | 7/1991 |

*Primary Examiner*—Christopher J. Novosad
(74) *Attorney, Agent, or Firm*—Richard C. Litman

(57) ABSTRACT

A multi-functional water jet weeder, cultivator, root waterer, and soil aerator device comprising a telescopic rod with an inclined handle grip, and having at least two interchangeable spraying heads of different size with two rows of multiple metal spikes surrounded by water jets, combinable with a water hose having a quick disconnect unit at the opposite end of the device, and an on/off water control switch on the handle grip. A fertilizer or herbicide can be added by attaching a reservoir on the handle grip.

15 Claims, 5 Drawing Sheets

WATER JET WEEDER, CULTIVATOR, ROOT WATERER, AND AERATOR

CROSS-REFERENCE TO RELATED APPLICATION

This application claims the benefit of U.S. Provisional Patent Application Ser. No. 60/350,612, filed Jan. 22, 2002.

BACKGROUND OF THE INVENTION

1. Field of the Invention

The present invention relates generally to gardening tools. More specifically, the invention is a telescopic hand held combination weeder, aerator, cultivator and a water jet sprayer.

2. Description of the Related Art

The relevant art of interest describes various multiple purpose gardening tools, but none discloses the present invention. There is a need for a multiple purpose gardening tool which incorporates an optional water source to water deeper around roots and the like. The related art will be discussed in the order of perceived relevance to the present invention.

U.S. Pat. No. 5,787,990 issued on Aug. 4, 1998, to William M. Miller describes a lawn tool for aerating, mulching, dethatching, seed, and fertilizing lawns which is lightweight and easy to use. The tool has a rectangular handle, a hollow shaft with a bend, a seed or fertilizer feeding container on the shaft, and a detachable soil breaking element comprising a triangular tube with a central vertical tube, a base portion having an interior damper for feed control of seed or fertilizer through holes, and three spike-tooth and rotatable wheel-like attachments along its base on T-shaped supports. A foot pedal is located on the vertical central tube for adjusting the flow of seed or fertilizer by an interior damper. The tool is distinguishable for requiring the triangular element with multiple rotatable spikes and a foot pedal.

U.S. Pat. No. 5,361,849 issued on Nov. 8, 1994, to Don L. Moore describes a hand tool having a water supply for cultivation and watering of gardens. The working end perpendicular to the tubular handle has a pair of teeth on one end and a blade with a cutting edge on the opposite end. A ball valve is attached to the opposite end of the handle and attached to a metal spring reinforced hose segment. The hose is connected to a liquid additive supply bottle standing on the ground. The gardening tool is distinguishable for requiring a working head with teeth and a cutting blade, a ball valve, and a remote liquid additive supply bottle in the hose line.

U.S. Pat. No. 3,143,984 issued on Aug. 11, 1964, to Henry Morasch describes a self-cleaning garden hoe and watering tool having a long tubular body, a hand actuated valve portion for connecting the tubular body to a water supply, and a rectangular hoe blade with water discharge openings on top which are arranged to allow the user to direct a controlled water stream against the side of the hoe blade. The garden tool is distinguishable for requiring a hoe blade and a hand actuated water valve.

U.S. Pat. No. 5,709,273 issued on Jan. 20, 1998, to Binson L. Roth describes a hand-held aerator gardening tool for removing soil to facilitate the addition of water, air and nutrients. A base plate having a substantially rectangular shape with round corners has a variable number of cylindrical tines arranged either in one row or in staggered rows and parallel to each other. The tines can be bolted into the base plate or molded together. The base plate and tines are connected to a solid handle at an angle by brackets. The tool is distinguishable for requiring cylindrical tines on a base plate attached by brackets to a solid handle.

U.S. Pat. No. 708,126 issued on Sep. 2, 1902, to John F. Chase describes a portable irrigator tool connected by a hose coupling to a water supply optionally containing fertilizer comprises a D-shaped handle connected to a piston inside the upper wooden staff which is connected to a lower hollow metal water reservoir section. A hollow fork head consisting of four curved hollow tines with apertures adjacent the solid points receives a supply of water or fertilizer in water via a threaded coupling tube at the top of the fork head. The handle is depressed to force the piston down and charge the lower section with water or fertilizer in water solution. The tool is distinguishable for requiring a curved four-tined hollow fork-head.

U.S. Pat. No. 1,408,584 issued on Mar. 7, 1922, to James H. Glasgow describes a fountain mixing garden tool comprising a hoe or rake attached to a water hose at the end of the hollow metal handle coupled to a water hose. A rotatable sprinkler element having a valve is rotatably attached proximate the hoe blade and has two parallel nozzles directed downwards toward the hoe blade. When water is not desired to wash the hoe and ground being hoed, the sprinkler element is rotated away. The tool is distinguishable for lacking tines and integrating the water outlets inside the hoe blade.

U.S. Pat. No. 3,326,306 issued on Jun. 20, 1967, to Basial B. Weir describes a water spade for drilling holes in the earth comprising a hollow metal shaft having metal T-shaped handle at one end, a water hose coupling proximate the handle, and either a single or doubled arrowhead cutter blade. The water is distributed down the cutter blade on both sides by the open joint. The length of the shaft can be extended with a coupling threaded onto two sections of the shaft in one embodiment. The tool is distinguishable for requiring arrowhead cutting blades.

U.S. Pat. No. 4,466,490 issued on Aug. 21, 1984, to Robert E. Eckels describes a hydraulic weeder consisting of a hollow tubular shaft attached at one end to a water hose and a positionally adjustable, and a hook-type gripping wire component under a flat water shield 6–8 inches from the bottom end. The gripping wire component can have three different ends such as spiral, curved and angled. The weeder is inserted next to a dandelion and twisted to engage the root and remove the dandelion in the presence of water. The weeder is distinguishable for requiring a distinct shield and gripping wires.

U.S. Pat. No. 4,606,089 issued on Aug. 19, 1986, to Garry L. King describes a ground working implement assembly having a handle and a plurality of nestable implement heads, wherein each head has a ground working member and a tang. One end of the handle has a socket assembly adapted to receive the tang of an implement head via a retaining pin. The head assembly includes a rake head, a hoe blade, a cultivator with tines, a chisel blade, and a weeder blade. The device assembly is distinguishable for requiring an assortment of working heads and lacking any integrated water support.

U.S. Pat. No. 5,056,440 issued on Oct. 15, 1991, to Alvin J. Eissens describes a water weeding tool comprising a 15 inch polyvinyl chloride or stainless steel tube with a valve connected directly to a water hose and to a 12 inch tube having a specifically structured nozzle flattened to form two side slots having two concave bottom surfaces. The water flow pattern forms two planar flows outward to wash away the first inch of soil around a dandelion by an inclined penetration. Then a vertical penetration next to the roots loosens the roots for pulling out by hand. The tool is distinguishable for requiring a specifically structured nozzle.

U.S. Pat. No. 5,257,666 issued on Nov. 2, 1993, to Charles E. Townsend, Jr. describes a stand up hand-held cultivator tool comprising an elongate steel spear shaft with three different welded on attachments to use with a water hose in a free hand. A pencil point, a three-pronged fork, and a bent weeder having a notched flat tip. The tools are distinguishable for requiring external application of water.

U.S. Pat. No. 5,822,968 issued on Oct. 20, 1998, to Rodney M. Savala describes a self-contained herbicide sprayer in an elongated garden tool such as a rake or hoe having a valve controlled by a switch or pushbutton on the handle, and pressurizing the herbicide liquid by a pump. The garden tool is distinguishable for requiring a switch, a pump and herbicide within the tool.

U.S. Pat. No. 6,109,013 issued on Aug. 29, 2000, to Ted D. Scott describes a multipurpose gardening tool comprising a handle which has a rake one side and a cutting bar on the opposite side that has limited movement when used as a cutting tool. Rotation of the handle 180° changes the utilization of the tool from a rake to a hoe or vice versa. The tool is distinguishable for requiring a rake with a cutting bar.

U.S. Pat. No. 6,289,828 B1 issued on Sep. 18, 2001, to Robert H. Wittenberg describes a manually operated tilling and seeding device comprising a tubular feed shaft equipped with a seed retaining chamber having a portal for loading seeds, a looped handle for rotating the shaft about an orbital axis, a tined circular tilling member head, and a seed valve regulating device. The soil is churned by manually rotating the shaft and seeding. The device is distinguishable for requiring a seed reservoir.

U.K. Patent Application No. GB 2 212 373 A published on Jul. 26, 1989, for Samuel F. Long describes a hand held weeding tool comprising a scoop having an apertured bottom with soil riddling or sifting means and weed retaining means on the riddling means. The publication is distinguishable for requiring an apertured bottom and lacking a water supply source.

German Patent Application No. DE 39 19 375 A1 published on Dec. 20, 1990, for Theodor Krachten describes an elongated garden weeding device having a tubular gripper and a soil penetrating pointed blade. The garden tool is distinguishable for requiring a tubular gripper and a soil penetrating pointed blade.

U.K. Patent Application No. GB 2 233 537 A published on Jan. 16, 1991, for George E. Hobbs et al. describes an apparatus head for cultivating the ground for sowing grass seed comprising a plurality of tool holders reciprocable vertically with respect to the frame and drive means for reciprocating the holder, and a tool removably attached to each holder. Each tool is attached to its holder by a spigot and includes a plate having two rows of tapered tines extending downwardly therefrom. The tool is distinguishable for requiring a rotating tool holder.

U.K. Patent Application No. GB 2 240 247 A published on Jul. 31, 1991, for Gary D. Lister describes a weed extracting tool comprising two connectable members which are movably connected to each and on a handle. The first connectable rod member has a pointed end and a movable partial cover for grasping weeds. The tool is distinguishable for being limited to a grasping function.

None of the above inventions and patents, taken either singularly or in combination, is seen to describe the instant invention as claimed. Thus, a water jet weeder, cultivator, root waterer, and aerator solving the aforementioned problems is desired.

SUMMARY OF THE INVENTION

The present invention comprises three different multi-functional devices incorporating the function of a water jet weeder, cultivator, root waterer, and soil aerator head on a telescopic handle having at least two spraying heads of different size with two rows of multiple metal spikes and combinable with a water hose at the opposite end of the device. The third device includes a fertilizer or herbicide source added by attaching a reservoir on the telescopic rod.

Accordingly, it is a principal object of the invention to provide a multi-functional gardening tool which can perform such tasks as a water jet weeder, cultivator, root waterer, and soil aerator.

It is another object of the invention to provide a multi-functional gardening tool having two removable different size heads having spikes and water nozzles on a telescopic handle.

It is a further object of the invention to provide a multi-functional gardening tool connectable to a water hose.

Still another object of the invention is to provide a multi-functional gardening tool having a fertilizer or herbicide supply on the tool.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
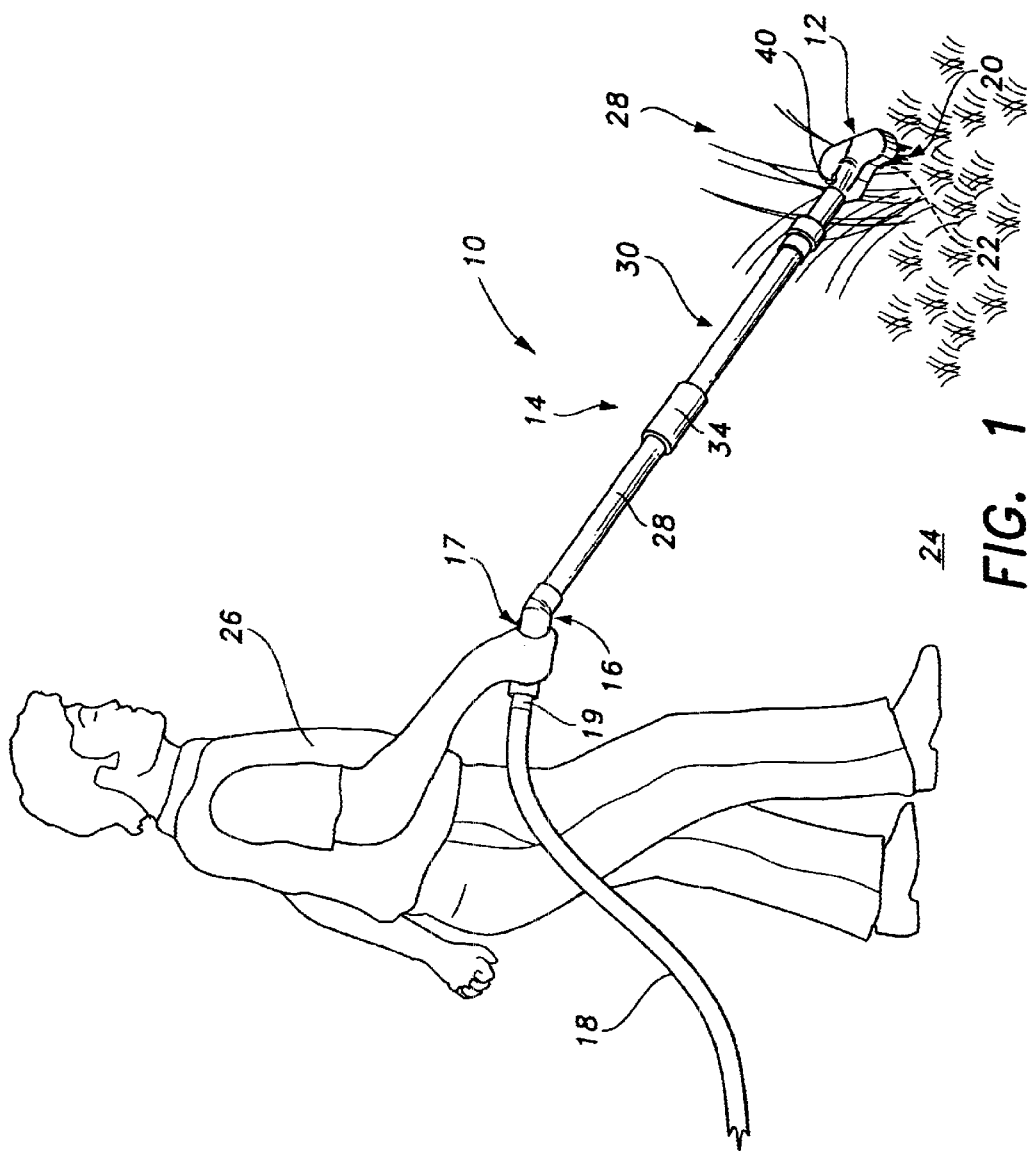
FIG. 1 is an environmental, perspective view of a first embodiment of a narrow bodied multi-function water jet weeder, cultivator, root waterer, and aerator device used by a person watering a plant according to the present invention.
Figure 2:
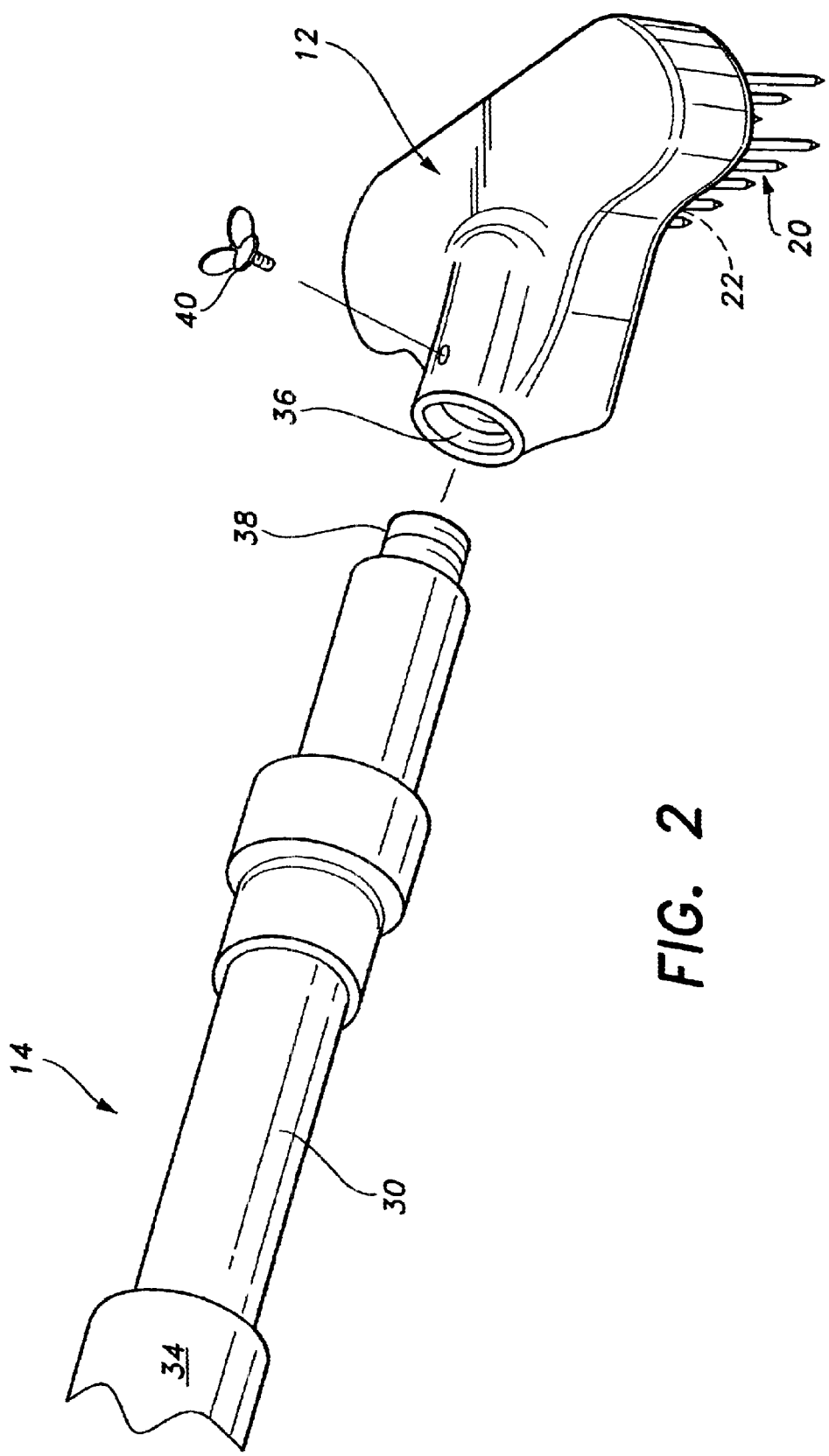
FIG. 2 is an exploded perspective view of the FIG. 2 water weeder according to the present invention.

The first embodiment of the present invention illustrated in FIGS. 1 and 2 is a telescopic hand held combination weeder, aerator, cultivator and a water jet sprayer apparatus 10 having a wide oblong head unit 12 on a telescopic tubular aluminum handle 14 suitable for weeding even between rows of plants. The handle 14 has a bent grip portion 16 connected to a water hose 18 with an on/off a brass quick disconnector structure 19 having an automatic shutoff valve which automatically prevents water supply when disconnected. The molded black plastic (nylon) head 12 has multiple stainless steel spikes 20 evenly spaced protruding from its bottom face. The head unit 12 also has small apertures 22, FIG. 4, surrounding each spike 20 to wet the spikes and the ground or soil 24 with jets of water. The person 26 can eliminate the weed 28 more readily by wetting and raking the adjacent soil to easily remove the weed 28. The telescopic handle 14 has a telescoping portion 30 sliding into the fixed handle portion 32, and which telescoping junction is secured by a friction-fitting flexible sleeve 34. The spikes 20 can be readily cleaned of debris by placing over a bucket and ejecting some water from the head unit 12.

In FIG. 2, the head unit 12 is illustrated in an exploded depiction separated from the fixed lower portion 32 of the handle 14 which has internal threading 36 for threading into the external threading 38 of the handle 14. Additionally, the head unit 12 is secured on the handle 14 by a wingnut 40 threaded into the threaded aperture 42. The spikes 20 for the larger head unit 12 are 1⅛ inches long, number 9 to 20, and preferably 11 spikes with 5 spikes in one row alternately spaced one-half inch from 6 spikes in the second row. This configuration can pick up aluminum cans, plastic bottles, pine cones, and the like debris.

Figure 3:
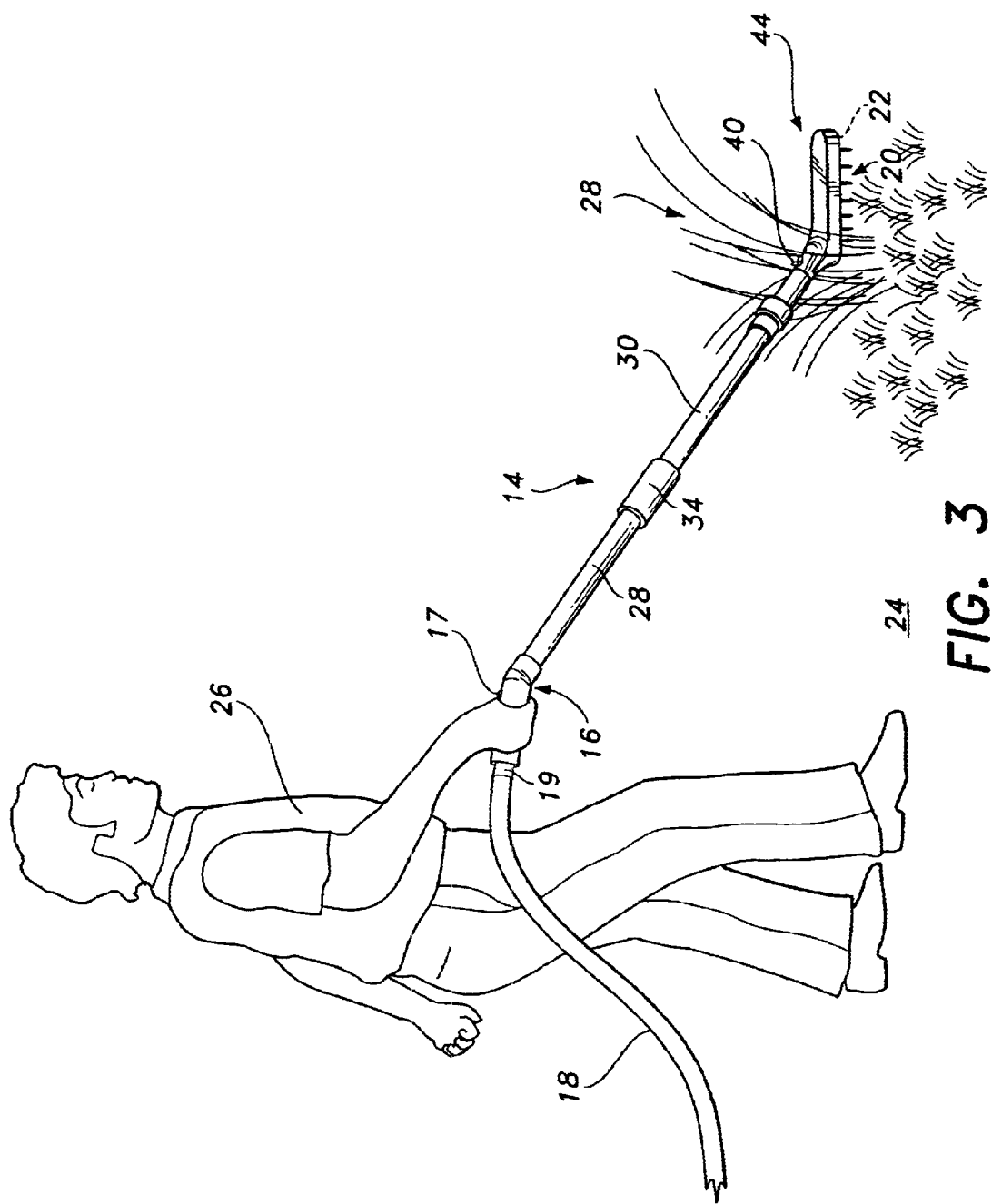
FIG. 3 is an environmental, perspective view of a second embodiment of a narrow bodied multi-function water jet weeder, cultivator, root waterer, and aerator device watering a plant according to the present invention.
Figure 4:
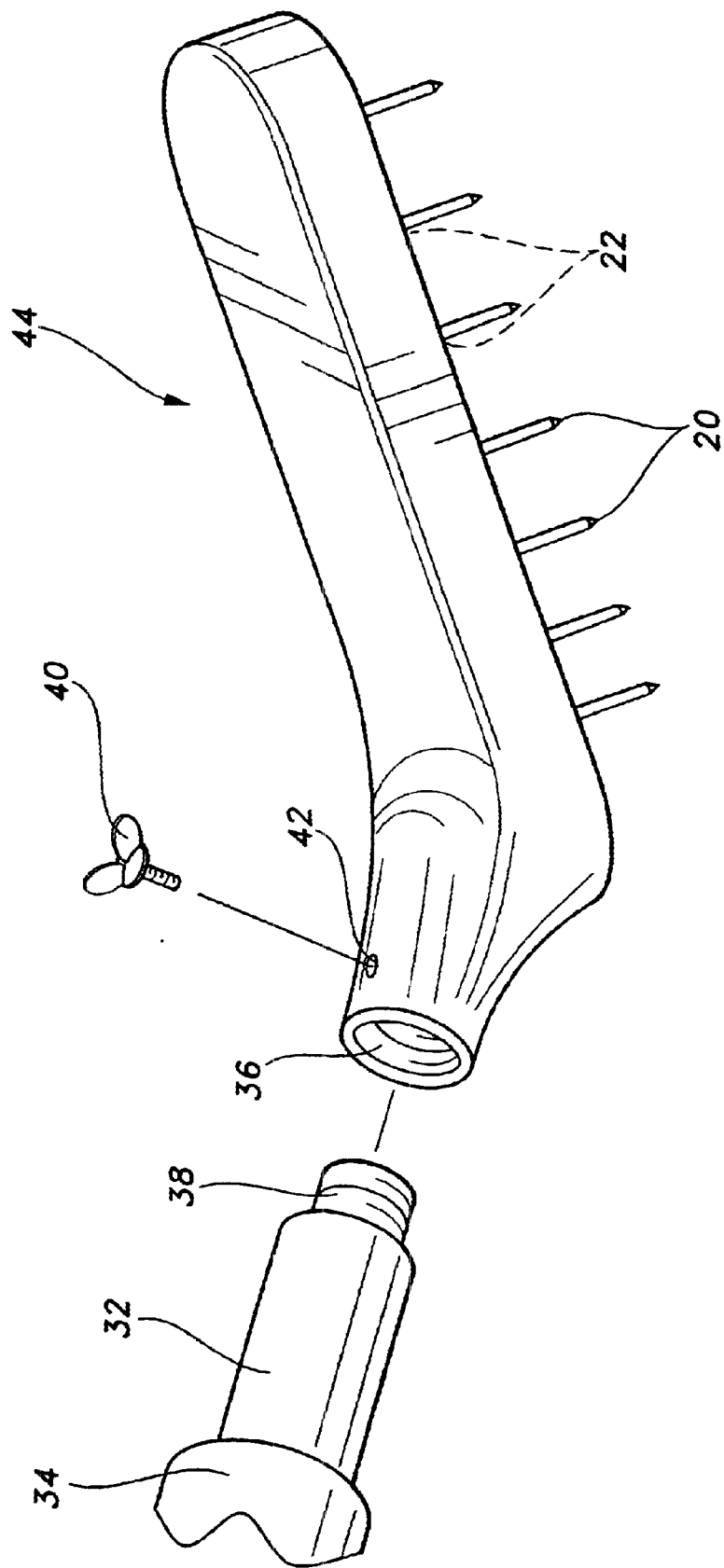
FIG. 4 is an exploded perspective view of the FIG. 3 water weeder according to the present invention.

Turning to the second embodiment illustrated in FIGS. 3 and 4, the narrow head water jet sprayer device 44 differs from the first embodiment in a narrow configuration with fewer spikes 20. The device 44 is approximately 1 inch wide and 3 inches long for reaching into tight spaces, and has only 4 to 8 spikes 20 which are organized in one or two rows.

Figure 5:
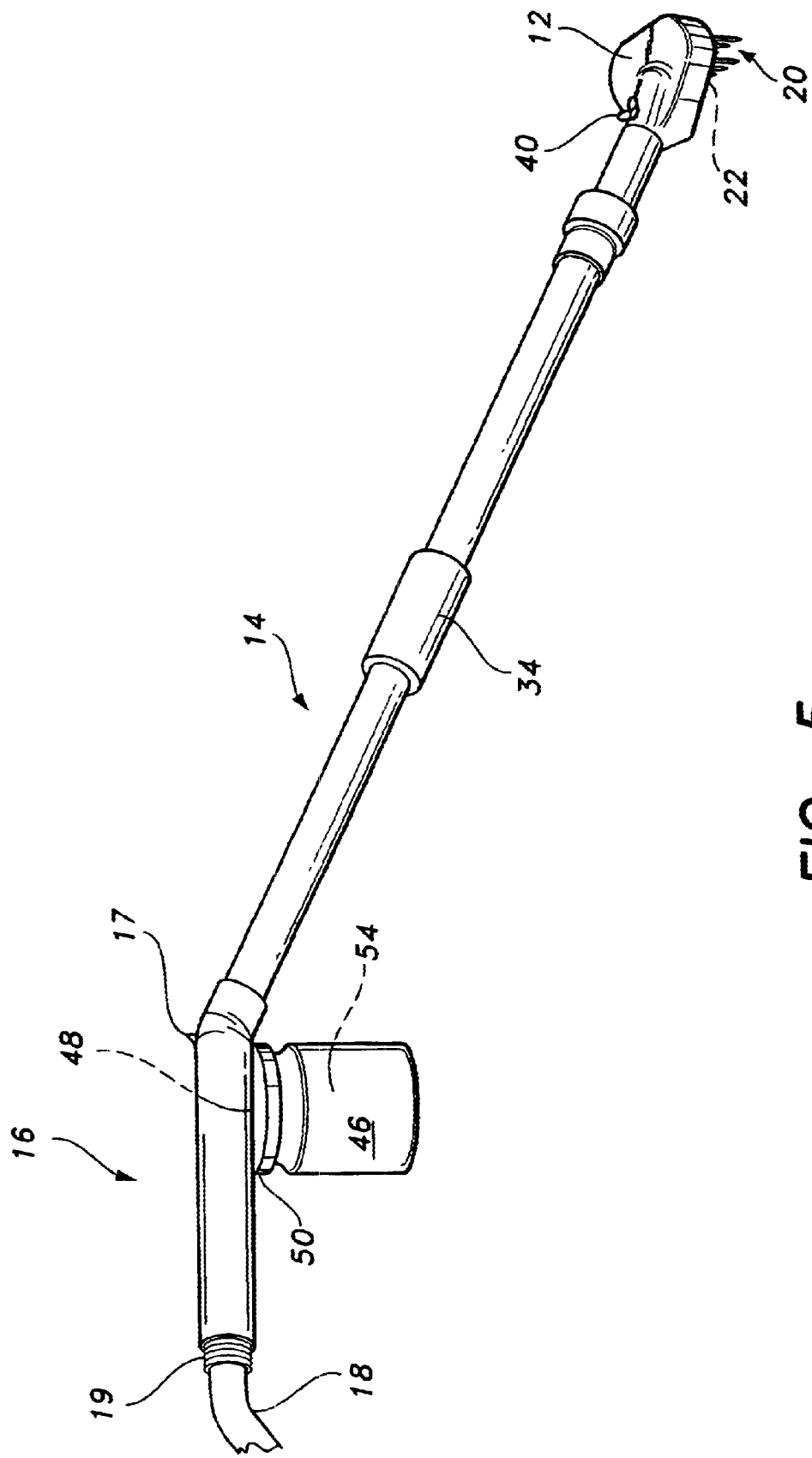
FIG. 5 is a third embodiment of a multi-function device having a plant food container attached in-line proximate the hose connection.

In FIG. 5, the third embodiment utilizes a container 46 which attaches to the bent grip portion 16 by suitable means such as a threaded neck 48 (hidden) on the cap 50 to be inserted into a threaded aperture 52 (hidden) in the bent grip portion 16 of the telescopic handle 14. When the switch 17 is turned on, the water passing from the hose 18 through the bent grip portion 16 would pick up either the fertilizer or herbicide liquid 54 to pass through the device 10 and out the head unit 12.

Thus, a multi-functional water jet weeder, cultivator, root waterer, and aerator device has been shown which is lightweight, approximately one pound, and easy to operate with one hand.

It is to be understood that the present invention is not limited to the embodiment described above, but encompasses any and all embodiments within the scope of the following claims.

I claim:

1. A multi-functional water jet weeder, cultivator, root waterer, and aerator device comprising:

an elongated, tubular, telescopic handle having a threaded end;

a threaded head unit removably attachable to the telescopic handle having an oblong shape;

said head unit having a bottom surface and multiple water jet apertures surrounding metal spikes distributed on said bottom surface of said head unit; and a handle grip at the opposite end of the telescopic handle adapted with a quick coupler structure to receive a water hose;

whereby water jet weeding, cultivating, root watering, and soil aerating are accomplished individually or simultaneously.

2. The multi-functional water jet weeder, cultivator, root waterer, and aerator device according to claim 1, wherein the handle grip is inclined downward.

3. The multi-functional water jet weeder, cultivator, root waterer, and aerator device according to claim 2, wherein the inclined handle grip has a water hose connected and an on/off switch for releasing water into the device.

4. The multi-functional water jet weeder, cultivator, root waterer, and aerator device according to claim 2, including a container attached to the handle grip for adding fertilizer or herbicide to the water passing through.

5. The multi-functional water jet weeder, cultivator, root waterer, and aerator device according to claim 1, wherein the threaded head unit has a wide oblong shape.

6. The multi-functional water jet weeder, cultivator, root waterer, and aerator device according to claim 1, wherein the threaded head unit has a narrow oblong shape.

7. The multi-functional water jet weeder, cultivator, root waterer, and aerator device according to claim 1, wherein the threaded head unit has a fastener for securing it to the handle.

8. The multi-functional water jet weeder, cultivator, root waterer, and aerator device according to claim 1, wherein the telescopic handle has a friction fitting elastic band for securing the extension.

9. The multi-functional water jet weeder, cultivator, root waterer, and aerator device according to claim 1, wherein the device weighs approximately one pound.

10. The multi-functional water jet weeder, cultivator, root waterer, and aerator device according to claim 1, wherein the wide oblong shaped head unit has 9 to 20 spikes designed for garden rows.

11. The multi-functional water jet weeder, cultivator, root waterer, and aerator device according to claim 1, wherein the narrow oblong shaped head unit has 4 to 8 spikes.

12. The multi-functional water jet weeder, cultivator, root waterer, and aerator device according to claim 1, wherein the inclined handle has a quick hose connect and disconnect structure with an automatic water cutoff.

13. The multi-functional water jet weeder, cultivator, root waterer, and aerator device according to claim 1, wherein the handle is made of aluminum.

14. The multi-functional water jet weeder, cultivator, root waterer, and aerator device according to claim 1, wherein the head unit body is made of black nylon.

15. The multi-functional water jet weeder, cultivator, root waterer, and aerator device according to claim 1, wherein the spikes are made of stainless steel.

* * * * *